United States Patent [19]
Place

[11] 3,987,257
[45] Oct. 19, 1976

[54] OPTICALLY COUPLED TWO-WIRE TO FOUR-WIRE HYBRID LINES

[75] Inventor: Harry Place, Ridgewood, N.J.

[73] Assignee: International Telephone and Telegraph Corporation, Nutley, N.J.

[22] Filed: May 29, 1975

[21] Appl. No.: 582,026

[52] U.S. Cl. .................. 179/170 NC; 250/199
[51] Int. Cl.² ............................................ H04B 1/58
[58] Field of Search ........... 179/2 C, 16 EA, 16 AA, 179/16 F, 18 FA, 170 R, 170 NC, 81 A, 84 A; 350/96 C; 250/199, 551

[56] References Cited
UNITED STATES PATENTS

| | | | |
|---|---|---|---|
| 3,402,297 | 9/1968 | Harris | 250/199 |
| 3,410,961 | 11/1968 | Slana | 179/18 FA |
| 3,783,198 | 1/1974 | Couch | 179/16 AA |
| 3,809,908 | 5/1974 | Clanton | 350/96 C |
| 3,842,216 | 10/1974 | Owen et al. | 179/84 L |
| 3,867,580 | 2/1975 | Russell | 307/311 |
| 3,874,780 | 4/1975 | Love | 350/96 WG |
| 3,878,397 | 4/1975 | Robb et al. | 350/96 C |

Primary Examiner—Kathleen H. Claffy
Assistant Examiner—Randall P. Myers
Attorney, Agent, or Firm—John T. O'Halloran; Alfred C. Hill

[57] ABSTRACT

Two-wire telephone lines connecting between subscriber telephones and the central office telephone system are coupled to four-wire transmission lines within the central office by means of phototransistors and light emitting diodes. The use of the phototransistors and light emitting diodes provides two-wire to four-wire conversion between balanced two-wire lines.

16 Claims, 7 Drawing Figures

OPTICALLY COUPLED TWO-WIRE TO FOUR-WIRE HYBRID LINES

BACKGROUND OF THE INVENTION

Connections between subscriber telephone lines and the telephone central office require some means for preventing electrical noise generated within the subscriber's line from interfering with the central office equipment. Further means is also required to prevent A.C. noise generated within the central office equipment from interfering with the subscriber's set. This is generally accomplished in the central office wiring arrangement by providing a balanced connection between the two-wire lines leading between the subscriber's set and the central office equipement and the four-wire lines used within the central office equipment. One method for providing balanced connection between the subscriber's two-wire line is to employ what is commonly referred to as a hybrid transformer and to connect the subscriber's two wires to one side of the transformer. Balance between the four wires of the central office equipment is accomplished by connecting the four wires to the other side of the hybrid transformer. The hybrid transformer in this application usually consists of four separate coil windings where the two-wire line is connected in series between two of the transformer coils. Two of the four central office wires are connected in series with a third coil, the other two wires are connected in series with a fourth coil. The fifth and sixth coils are connected together through a balanced resistor. This type of hybrid transformer connection allows voice frequency modulated D.C. signals to transmit readily between the two-wire subscriber lines and the four-wire central office lines but prevents A.C. signal noise from transferring due to the phase balance relationship within the respective two-wire and four-wire lines.

A known alternate arrangement for connecting between two-wire subscriber lines and four-wire central office lines is by the use of a resistor hybrid and a pair of isolation transformers. Here the subscriber two-wire line is connected to one stage of a three-leg wheatstone bridge connection. The other two stages of the bridge are respectively connected to one side of a pair of isolation transformers. The four-wire lines are then connected respectively by two wires to the other side of one isolation transformer, and by two wires connected to the other side of the other isolation transformer. Here the balance between the individual wires of the two-wire line is provided by the first stage of the wheatstone bridge, and balance is provided between the first pair and second pair of wires by means of the second and third stages of the bridge. In both the conventional transformer hybrid and resistor hybrid arrangements direct current is prevented from transferring between the two-wire subscriber lines and the four-wire central office lines because of the inability of direct current to pass through transformers, whereas modulated direct current carrying voice frequency information readily transfer between the subscriber two-wire lines and the central office four-wire lines.

Both methods for preventing feedback between the two- and four-wire lines, as described above, are efficient devices for providing isolation between the two-wire and four-wire lines and for preventing D.C. transfer. Current telephone technology is, however, directed to replacing the larger and expensive electromechanical and electromagnetic components in telephone circuits with smaller, less expensive and less lossy devices. This is especially important where mobile communication systems are employed for military purposes where size, weight and loss must be reduced to the barest minimum.

The purpose of this invention, therefore, is to provide effective isolation between two-wire and four-wire telephone lines at a substantial reduction in both size and cost.

SUMMARY OF THE INVENTION

The invention provides methods and apparatus for optically coupling between two-wire and four-wire telephone lines. The electromagnetic components of the prior art are replaced with rapid switching elements and inexpensive solid state components of greatly reduced size. A light emitting diode and a phototransistor are connected in series in each wire of the two-wire line, a pair of phototransistors are connected in series in one wire of the four-wire line, and a pair of light emitting diodes is connected in series in another wire of the four-wire line. Optical coupling between the two-wire and four-wire lines is provided by light generated within the light emitting diodes and received by the phototransistors of the respective two-wire and four-wire lines.

GENERAL DESCRIPTION OF THE INVENTION

When communication proceeds from the two-wire to the four-wire line, voice modulated D.C. causes the light emitting diodes in the two-wire line to emit light at the same voice frequency. The modulated light is received by the phototransistors in the four-wire line when communication proceeds in the four-wire direction. Communication is provided from the four-wire line by the light generated by the light emitting diodes in the four-wire line, and is received by the phototransistors in the two-line when communication is in the direction of the two-wire line.

The use of a pair of oppositely polarized light emitting diodes and oppositely polarized phototransistors in the two-wire lines provides sufficient electrical balance between the lines and effectively removes any A.C. noise generated within the two-wire line. The use of a pair of light emitting diodes polarized in the same direction in one of the four-wire lines, and the use of a pair of phototransistors polarized in the same direction in another of the four-wire lines together with a balance resistor connecting between the lines provides electrical balance between each of the two pairs of wires in the four-wire lines. Extraneous alternating current generated within the four-wire system is thereby prevented from transferring between the two pairs of wires constituting the four-wire line.

Communication is generated between the two-wire and four-wire lines by the modulation of the D.C. current within the two-wire line to provide fluctuating light intensity at both light emitting diodes in the two-wire circuit. The variation of the current through the microphone provides modulated audio signals which in turn vary the current passing through the light emitting diodes to modulate the output light intensity of the diodes in response to the modulations in the audio signal generated within the microphone of the telephone subset. In one embodiment the phototransistors within the four-wire lines are placed in close proximity to the light emitting diodes of the two-wire lines so that the audio-modulated light intensity, generated by the light emitting diodes, is received by the phototransistors causing the current passing through the phototransistors, from a separate battery, to vary in response to the incident light variations. This optically modulated current passing through the phototransistors in one of the four-wire lines is then amplified by an operational amplifier and is further processed on standard telephone equipment.

Communication from the four-wire line to the two-wire line is provided by the audio-modulated D.C. passing through the light emitting diodes in the four-wire lines and resulting in modulated light intensity from the light emitting diodes. This modulated light intensity is then received by the phototransistors in the two-wire lines resulting in modulated D.C. current for conversion to audio frequency at the receiver subset.

DESCRIPTION OF THE PREFERRED EMBODIMENT

Figure 1:
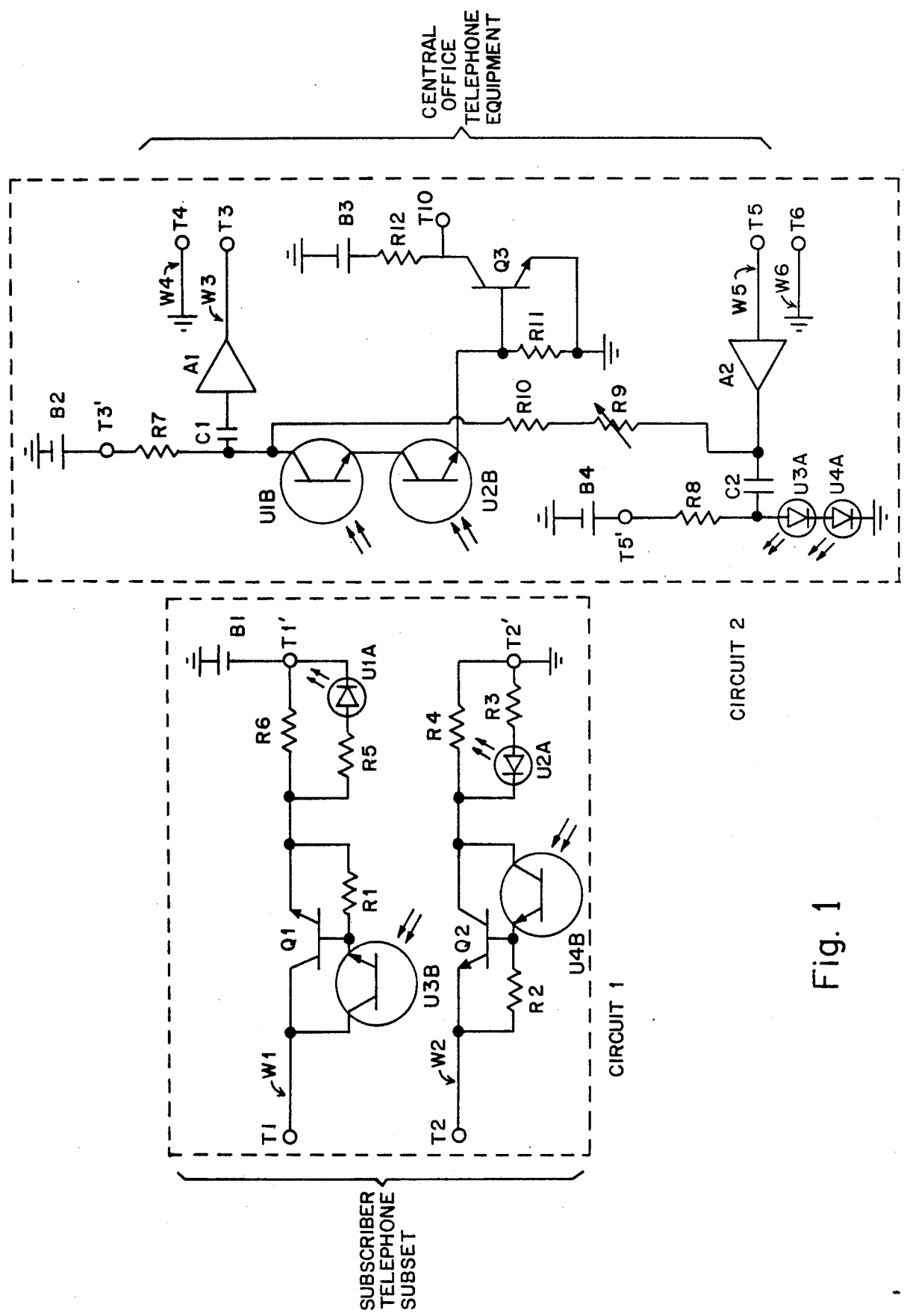
FIG. 1 is a schematic diagram of the optically coupled hybrid circuit of this invention.

FIG. 1 shows a pair of wires W1, W2 comprising a two-wire telephone line, designated by the broken lines as circuit 1, having a pair of input terminals T1 and T2, respectively. T1 is connected to the transmitter line of a standard telephone subset (not shown) and T2 is connected to the receiver line of the same telephone subset. A standard type NPN transistor Q1 is serially connected in the first wire telephone line W1 and a phototransistor U3B is connected between the collector and the base of Q1. The resistor R1 is connected between the base and emitter of Q1. Light emitting diode U1A is also connected in the first wire W1. The cathode of the light emitting diode U1A is connected to the emitter of transistor Q1 by means of resistor R5, and resistor R6 is connected in parallel with light emitting diode U1A and resistor R5. Wire W1 is connected to the negative pole of a 48 volt battery B1, by means of terminal T1' and the positive pole of B1 is grounded.

The second wire W2 is connected to the telephone subset receiver (not shown) by means of terminal T2. A second transistor Q2 is serially connected in wire W2 in opposite polarity to the aforementioned first transistor Q1. A phototransistor U4B is connected in line W2 with its collector common to the collector of transistor Q2 and with the emitter of U4B connected to the base of Q2. The emitter of phototransistor U4B is connected to wire W2 by means of resistor R2. A light emitting diode U2A is connected in wire W2 in opposite polarity to the light emitting diode U1A of wire W1, with its anode connected to both the collector of phototransistor U4B and the collector of transistor Q2. The cathode of light emitting diode U2A is connected to ground at terminal T2' by means of resistor R3, and resistor R4 is connected in parallel with the light emitting diode U2A and resistor R3.

When the subscriber lifts the telephone handset, connected is provided between the first and second wires W1, W2, by means of the hook switch in the subscriber telephone subset (not shown). Battery B1 then becomes coupled through the first and second wires W1, W2 to ground, and battery current is caused to flow through the two-wire line. In the on-hook condition the battery B1 in the first wire W1 is isolated from the second wire W2 by means of the open circuit on-hook condition of the subscriber telephone subset. In the off-hook condition, battery current flows through R6, Q1, Q2, R4 and light emitting diodes U2A and U1A, respectively, and causes both diodes to emit light. When the subscriber commences speaking into the transmitter portion of the telephone subset the transducer within the subset, in a known manner, causes variations in the subscriber loop current to vary in frequencies ranging from 250 – 2800 cycles. The current flowing through the subscriber loop therefore varies in response to the vibrations within the aforementioned transmitter and this variation in current causes both light emitting diodes U1A, U2A to vary in emitted light intensity.

The four-wire line, defined for the purpose of this embodiment as the central office four-wire loop and designated in dashed lines as circuit 2, consists generally of a first pair of wires designated as W3 and W4 in FIG. 1, and a second pair of wires W5 and W6. A source of positive D.C. voltage B2 is connected to terminal T3' of wire W3 through resistor R7, capacitor C1, and operational amplifier A1 to output terminal T3 which together with terminal T4 are connected to the transmission circuit within the central office system (not shown). Also included in wire W3 are phototransistors U1B, U2B, such that the collector of phototransistor U1B connected to one side of capacitor C1 and the emitter of phototransistor U1B is connected to the collector of phototransistor U2B. The emitter of phototransistor U2B is connected both to ground through resistor R11 and to the base of a standard type NPN transistor Q3. A second source of positive voltage B3 is connected to the collector of transistor Q3 by means of resistor R12 and to a supervisory terminal T10. The purpose of the supervisory terminal T10 will be discussed below in greater detail.

The second pair of wires W5, W6 constituting the third and fourth wire of the central office four-wire loop are described as follows. Terminal T5' of wire W5 is connected to a fourth source of positive D.C. voltage B4. Capacitor C2 and operational amplifier A2 are connected to terminal T5 through resistor R8. Terminals T5 and T6 are connected to the receiving circuit in the central office system (not shown). A pair of light emitting diodes U3A and U4A are serially connected to wire W5 between capacitor C2 and ground. The anode of light emitting diode U3A is connected to one side of capacitor C2, the cathode of light emitting diode U3A is connected to the anode of light emitting diode U4A and the cathode of light emitting diode U4A is connected to ground. Operational amplifier A2, connected to the other side of capacitor C2, is coupled with the receiving circuit of the central office equipment at terminal T5 as described earlier. Wires W5 and W3 are connected together by means of variable resistor R9 and resistor R10 connected in series between one side of the capacitor C2 of wire W5 and one side of capacitor C1 of wire W3. Resistors R9 and R10 provide balanced connection between wires W3 and W5 so that signals arriving at W5 are not coupled to signals outgoing on W3.

Wire W4, connected to ground at one end and to terminal T4 at the other end, therefore constitutes the second wire of the first pair of wires of the central office four-wire loop. Wire W6, connected to ground at one end and to terminal T6 at the other end, constitutes the second wire of the second pair of wires in the central office four-wire loop.

OPERATIVE EXAMPLES OF THE PRIOR ART

Figure 2:
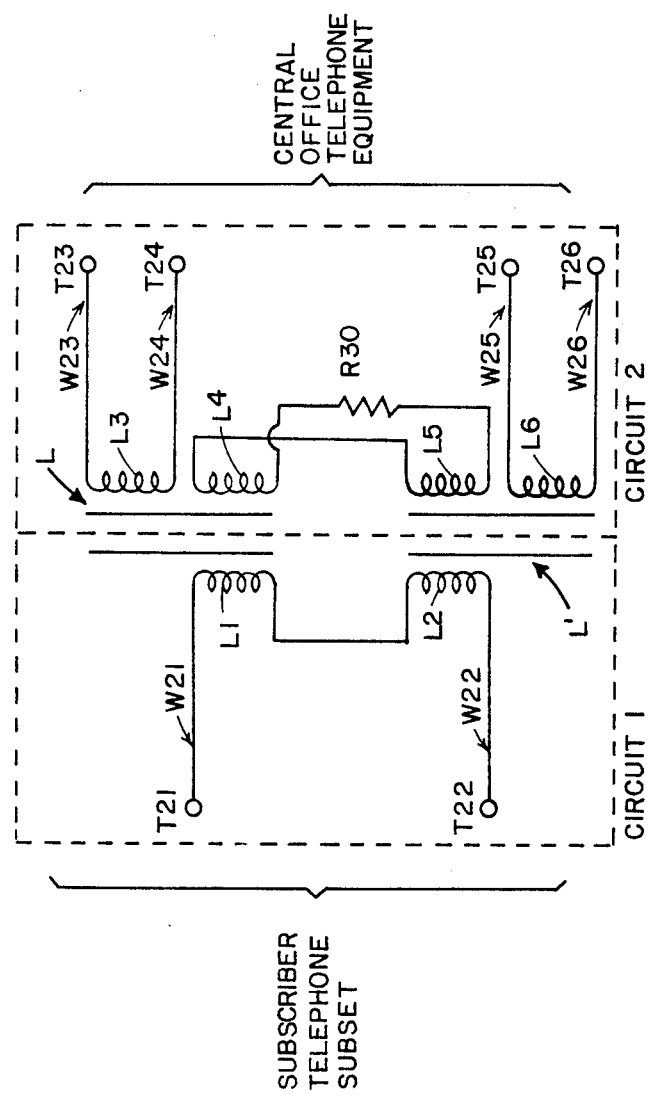
FIG. 2 is a schematic diagram of a conventional transformer hybrid circuit.

In order to more fully describe the optically coupled hybrid circuit of the invention reference is made to the conventional transformer hybrid of FIG. 2. Here a pair of wires W21 and W22 comprise the two-wire telephone lines similar to the two-wire lines W1 and W2 of FIG. 1, and designated by the dashed lines as circuit 1. Wire W21 is connected to the transmitter of the subscriber telephone subset (not shown) by means of terminal T21, and wire W22 is connected to the receiver of the subscriber telephone subset (also not shown) by means of terminal T22. One end of wire W21 is connected to one winding L1 of a first hybrid transformer L, and wire W22 is connected to one winding L2 of a second hybrid transformer L'. The windings L1 and L2 of both hybrid transformers L, L' are connected together in series.

The four-wire central office loop designated as circuit 2 and similar to circuit 2 of FIG. 1 comprises a first pair of wires W23 and W24 connected in series with a winding L3 on the opposite side of transformer L. Wires W23, W24 are connected to the transmission circuit within the central office system (not shown) by means of terminals T23, T24, respectively. The other pair of wires in the central office four-wire loop consists of wires W25 and W26 connected in series with winding L6 on the other side of transformer L'. Connection is made to the receiving circuit in the central office system (not shown) by means of terminals T25 and T26. Winding L5 of transformer L' is connected in series with winding L4 of transformer L and in series with balance resistor R30.

Comparison between the inventive optically coupled hybrid circuit of FIG. 1 can be seen as follows. When the subscriber removes the handset from the subscriber subset (not shown) the off-hook switch within the subset connects wire W21 to wire W22 and to a source of negative D.C. voltage (not shown). D.C. current now begins to flow through the loop consisting of wires W21 and W22 and windings L1 and L2. When the subscriber talks into the speaker, which is coupled to wire W21 by means of terminal T21, the direct current then becomes modulated in response to the variations in the subscriber's voice. The modulated direct current induces equal and opposite currents in the winding L3 of hybrid transformer L and the modulated current then transmits to the central office transmission system by means of wires W24 and W23 and terminals T24 and T23. In a like manner, when a caller by means of the central office receiving circuit (not shown) communicates with the subscriber voice frequency modulated current, by means of terminals T25 and T26 and wires W25 and W26, is impressed upon winding L6 of the hybrid transformer L'. The modulated current then becomes induced in winding L2 on the other side of the hybrid transformer L' and transmitted to the subscriber's receiver by means of terminal T22. Since wires W21, W22 are balanced, spurious A.C. noise is effectively eliminated by the differential phase relationship existing between wires W21 and W22 so that extraneous noise does not become transformed through the hybrid transformers with the modulated D.C. The direct current which is not modulated, for example, when there is a pause in the telephone conversation, is likewise unable to transfer between line W21 and lines W23 and W24 because of the inability of direct current to electromagnetically couple thorugh a transformer. Coupling of signals arriving on wires W23 and W24, and leaving on wires W25 and W26, is also improved by means of the balance provided between connection windings L4 and L5 since currents induced in the respective windings are out-of-phase and therefore cancel.

Figure 3:
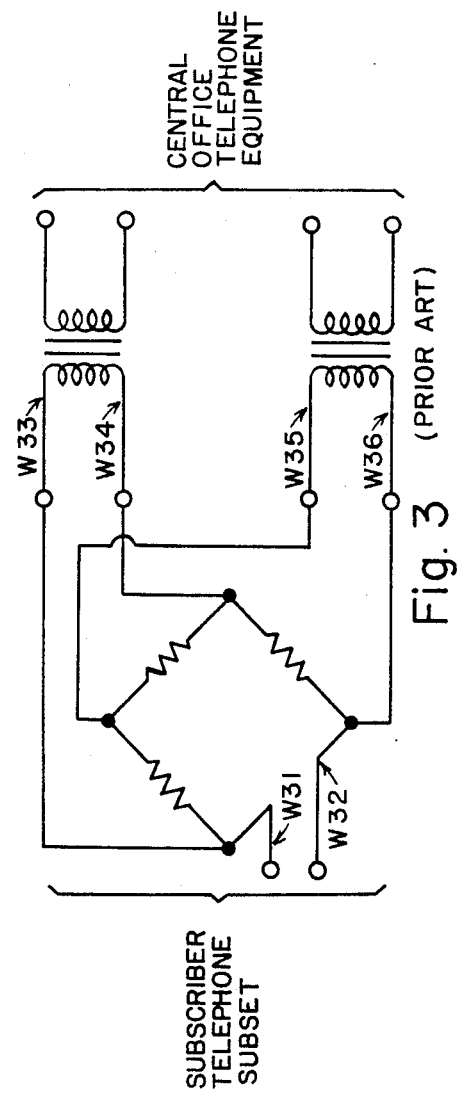
FIG. 3 is a schematic diagram of a conventional resistor hybrid circuit.

FIG. 3 is presented as a further example of the prior art method for connecting between two-wire and four-wire telephone lines using a balanced resistor hybrid connection similar to a wheatstone bridge. The connection between the two-wire lines W31, W32, and four-wire lines W33, W34, W35, W36 is similar to the transformer hybrid of FIG. 2 and the results are essentially the same.

The optically coupled hybrid circuit of FIG. 1 provides all the benefits of the prior art circuits shown in FIGS. 2 and 3 with the added improvement of low cost, rapid response, very little resistance losses, and substantial reduction in weight.

OPERATION OF THE PREFERRED EMBODIMENT

The embodiment depicted in FIG. 1 further provides supervision capabilities since the bias current flowing through phototransistors U1B and U2B flows through resistors R11 and the base of transistor Q3 as described earlier for the off-hook condition. In the on-hook condition, however, no current flows through the aforementioned light emitting diodes U1A and U2A and subsequently the phototransistors U1B and U2B are virtually an open circuit. For the same reason no current flows through resistors R7, R11 and the base of transistor Q3. Since the transistor Q3 is non-conducting no current flows through resistor R12 and the output voltage at terminal T10 is equal to the voltage of battery B3 and represents a condition of logic "1." When the subscriber removes the telephone handset, and causes the hook switch to close, current then flows through resistor R7, phototransistors U1B, U2B, resistor R11 and transistor Q3. This causes transistor Q3 to become fully conducting, and the output voltage at T10 becomes +0.5 volts, the saturation voltage of Q3, that is a logic "0."

Since the two-wire line W1, W2 is a balanced line, when a longitudinal signal, such as power line hum, becomes impressed upon either line the induced current will then be out-of-phase between U1A and U2A. The instantaneous current for example, would increase in U1A and the instantaneous current would decrease in U2A resulting in a net current cancellation. The same effect occurs in the phototransistors U1B and U2B since the instantaneous resistance change in U1B is caused to increase because of the increased light generation from diode U1A, while the instantaneous resistance decreased in U2B due to the effects of the light emitted from light emitting diode U2A. Another advantage with the optical coupling provided by the instant invention is that there is no false "off-hook" indication which commonly occurs when there is a short-to-ground as a result of an exchange cable fault. In this case light emitting diode U1A, for example, would become activated and diode U2A would not. This would prevent current from transferring through phototransistor U2B and through transistor Q3 and, therefore, avoid a false off-hook indication at supervisory terminal T10.

Signals originating from the central office equipment to terminals T5 and T6 are amplified by amplifier A2 and applied to modulate light emitting diodes U3A and U4A. The light emitting diodes U3A and U4A are connected in series and biased in the linear range by resistance R8 and battery B4. The modulation of U3A and U4A in turn varies the light output generated by U3A and U4A and in turn varies the instantaneous resistance of phototransistors U3B and U4B, respectively, in the two-wire subscriber loop. Since phototransistors U3B and U4B usually are incapable of carrying typical loop currents of approximately 50 miliamps, they are arranged in this circuit in an emitter-follower configuration with standard NPN type transistors Q1 and Q2 as described earlier. The modulating signal now generated within the two-wire subscriber loop W1, W2 becomes conveyed to the earphone of the subscriber telephone subset and connected to terminals T1 and T2. Balance is obtained in the four-wire central office loop in the following manner. A portion of the modulating signal from A2 is fed to the input of amplifier A1 by means of the connection through resistors R9 and R10 which is connected to the input of operational amplifier A1 by means of capacitor C1. In this application resistors R9 and R10 behave similar to the hybrid balance resistor R30 described in the prior art hybrid transformer circuit of FIG. 2. The aforementioned signal emitted by photodiodes U3A and U4A to phototransistors U3B and U4B energizes light emitting diodes U1A and U2A in the subscriber loop, which optically transfers the signal back to phototransistors U1B and U2B in the four-wire loop to provide a modulating signal to operational amplifier A1. The signal described earlier as transmitted from operational amplifier A2 through resistors R10 and R9 is of equal magnitude and opposite phase from the signal received from phototransistors U1B and U2B causing the signals to cancel and thereby provide the required hybrid balance.

Figure 5:
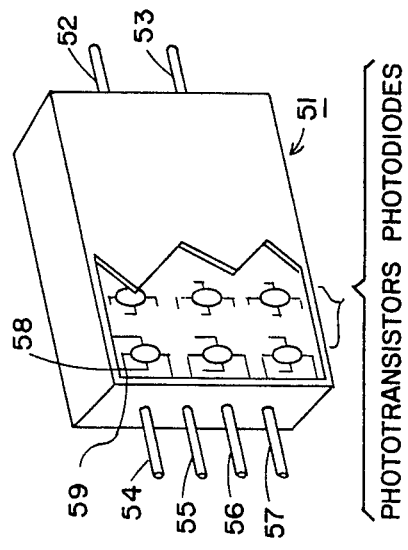
FIG. 5 is an enlarged schematic diagram of the photodiodes and phototransistors of FIG. 1 in optical proximity to each other.
Figure 4:
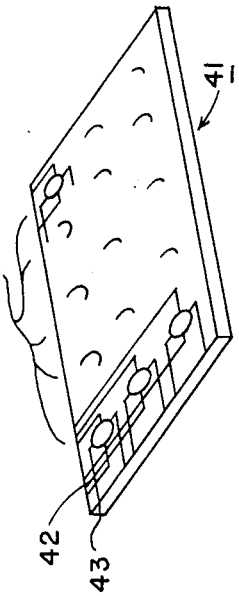
FIG. 4 is a perspective view of a package containing the components of the circuit of FIG. 1.

In the foregoing description of the preferred embodiment depicted in FIG. 1 the two-wire subscriber line has been separated by the broken lines described as circuit 1 (subscriber two-wire loop) and the four-wire line by the broken lines designated as circuit 2 (central office four-wire loop). This has been done in the interest of clarity only since the photodiodes designated U1A, U2A and the corresponding phototransistors U1B and U2B are generally in close proximity in the form of a dual-in-line integrated circuit. This is also true for the light emitting diodes U3A, U4A and their corresponding phototransistors U3B and U4B. Since all the circuit components involved are of solid state composition and of miniature size, the circuitry readily lends itself to a printed circuit configuration. This is depicted, for example, in FIG. 4 as a circuit board generally designated as 41 containing a plurality of photodiodes and phototransistors having the photodiode and phototransistor components on the same semiconductor chip schematically represented as output leads 42 and 43, respectively. FIG. 5 shows the inventive optically coupled circuit in an encapsulated package 51 where the two-wire line connection terminals 52, 53 extend from one end, and the four-wire line conections 54, 55, 56, and 57 extend therefrom the opposite end of the package 51. The photodiodes and phototransistors, here designated by leads 58, 59, are also shown in close proximity on the same chip material within the encapsulated package 51. The encapsulated package, therefore, could be readily mounted within the central office switching system, and subscriber lines to a plurality of subscriber substations would, therefore, be electrically connected with the central office system to a plurality of encapsulated packages each containing a number of photodiodes and phototransistors as described within the aforementioned preferred embodiment. This configuration provides rapid installation and replacement properties to the circuit since the encapsulated package is light, compact and readily connected and disconnected by means of the extending leads, 52, 53, 54, 55, 56 and 57.

Figure 6:
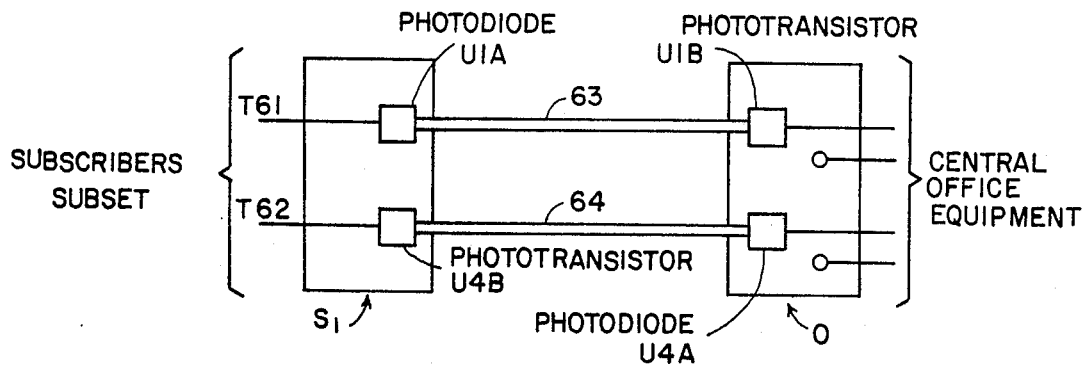
FIG. 6 is an embodiment employing optical fiber interconnections between the subscriber's subset and the central office equipment.

An alternate embodiment of the inventive circuit depicted generally in FIG. 1 can now be described as follows. Instead of mounting the circuit elements contained within the two-wire line block designated by the broken lines as "circuit 1" in close proximity with the four-wire line block designated by the broken lines entitled "circuit 2" in FIG. 1, the subscriber two-wire loop could be located, for example, on the subscriber's premises and the central office four-wire loop could be located in a central office telephone substation. Instead of conventional telephone wires connecting between the subscriber's subset and the terminals T1 and T2 within the central office system, as described earlier, the subscriber's subset would be directly connected to the terminals T1 and T2. Connection between the subscriber two-wire loop on the subscriber's premises and the central office four-wire loop in the remote central office facility could be made by means of optical fibers extending from the subscriber's premises to the central office location. One end of the optical fiber, described for the purpose of this embodiment as a glass or plastic fiber as is currently used for transmission of light over long distances, is coupled in optical proximity to one of the light emitting diodes (U1A or U2A) of the circuit described in FIG. 1. The opposite end of the optical fiber is connected to one of the phototransistors (U1B or U2B) at the central office location. Communication is, therefore, provided between the light emitting diode and the phototransistor by means of the light conducted through the optical fiber in a similar manner as described earlier when the optical fiber was not present and the light emitting diode and phototransistors were in close proximity. Another optical fiber is coupled in optical proximity with either of the light emitting diodes U3A, U4A in the central office location at one end and with either of the phototransistors (U3 or U4B) in the subscriber two-wire loop at the subscriber's premises. The operation of this embodiment is similar to the operation of the preferred embodiment of FIG. 1, since modulated light is transmitted between the light emitting diodes and phototransistors, the only difference being the connection therebetween the light emitting diodes and phototransistors by the optical communication fibers. The use of the optical fibers now obviates the need for electrical balance between the two wires of the subscriber two-wire loop and between the two pairs of wires in the central office four-wire loop. Optical communication fibers of the type, for eample, consisting of a high refractive index light transmissive core covered with a low index of refraction cladding have been found to readily transmit optical energy and are independent from the electromagnetic induction problems of the electrically conducting telephone wire described earlier. The use of the optical fibers to connect between a light emitting diode in the subscriber two-wire loop and the phototransistors of the central office four-wire loop, and an optical fiber to connect between a phototransistor in the subscriber two-wire loop and a photodiode in the central office four-wire loop simplifies the circuit of FIG. 1 considerably. Only one photodiode, for example, U1A is necessary. In this embodiment light emitting diode U1A remains in the wire W1 and connects directly with the telephone subset transmitter by means of terminal T1 and the transistor Q1, phototransistor U3B and resistor R1 are no longer required. Phototransistor U4B, transistor Q2 and resistor R2 are connected as described earlier in wire W2 and photodiode U2A and resistors R3 and R4 are no longer required. In the central office four-wire loop either phototransistor U1B or U2B is no longer required. The result is shown diagrammatically in FIG. 6 by a circuit board S1 located on the subscriber's premises and connected to the subscriber's subset by means of terminals T61 and T62 and connected to a central office circuit board O by means of optical fibers designated as 63 and 64. Optical fiber 63, for example, cold terminate in optical proximity to photodiode U1A at one end and phototransistor U1B at the opposite end. Optical fiber 64 could terminate in optical proximity to the phototransistor U4B at one end, and in optical proximity to the photodiode U4A at the opposite end. In this alternative embodiment telephone communication proceeds from the voice frequency modulation of light by photodiode U1A, transmits along optical fiber 63 and impinges upon phototransistor U1B. The voice frequency modulated signal is then switched by conventional switching means where the signal is reconverted to voice frequency light energy by mean of the light emitting diode in the central office system (not shown). Communication from the central office back to the subscriber subset proceeds by means of photodiode U4A, voice frequency modulated as described earlier, and emitting light for transmission through optical fiber 64 where it is received by phototransistor U4B and transmitted to the subscriber's subset by means of terminal T62. This embodiment readily provides direct substitution for the multitude of two-wire telephone wires extending from the central office system to numerous subscriber's homes and buildings with inexpensive and efficient optical fibers on existing telephone poles and associated support structure. The problem of A.C. noise induction and voltage surges generated along the telephone wires of the prior art is obviated by the impossibility of electromagnetically introducing noise into the electrically non-conductive fibers.

Figure 7:
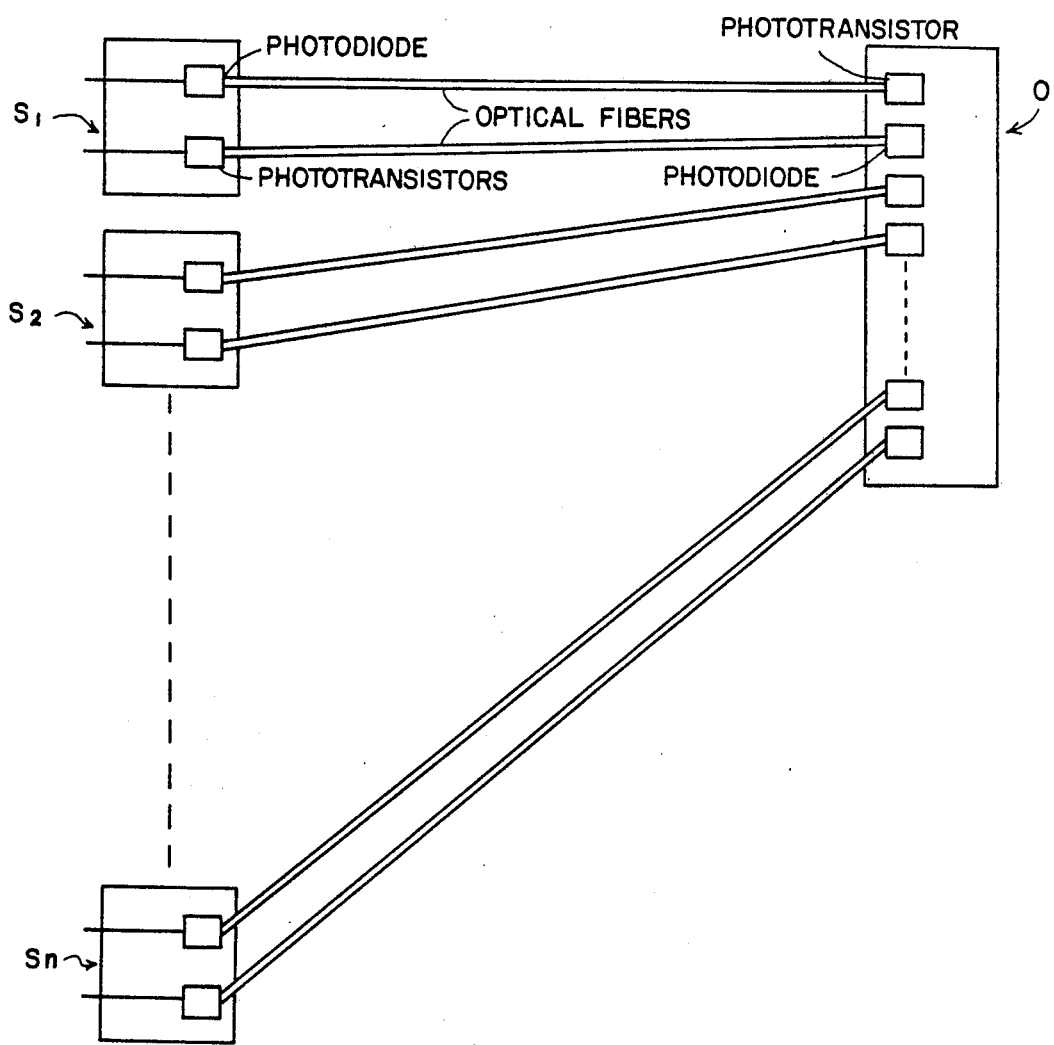
FIG. 7 is a schematic representation of the embodiment of FIG. 6 for a plurality of optical fiber interconnections.

FIG. 7 shows how a plurality of subscriber subsets designated diagrammatically as $S_1$ to $S_n$ could be connected by means of pairs of optical fibers in a satellite configuration with the central office O.

Although the invention is directed to optical coupling between telephone lines other immediate applications for optically transferring intelligence such as telegraphy, multiplexing and television scanning transmission may also find application in this invention. The embodiments given are, therefore, by way of example only and are not in any way intended to limit the scope of the invention.

What is claimed is:
1. A device for coupling between electrical communication lines comprising:
    first circuit means containing a first pair of electrical communication wires and a first portion of a hybrid circuit means terminating said first pair of wires;
    second circuit means containing a second pair of electrical communication wires, a third pair of electrical communication wires and a second portion of said hybrid circuit means terminating said second and third pairs of wires;
    said first and second hybrid circuit means enabling bidirectional communication between said first and second circuit means included in said first and second portions of said hybrid circuit means; and
    optical coupling means for providing D.C. isolation between the wires of said first, second and third pairs and A.C. balance between the wires of said first pair, between the wires of said second pair and between the wires of said third pair.
2. The device of claim 1 wherein said first circuit means comprises a two-wire telephone circuit.
3. The device of claim 1 wherein said second circuit means comprises a four-wire telephone circuit.
4. The device of claim 1 wherein said optical coupling means comprises at least one light emissive means and at least one light responsive means.
5. The device of claim 4 wherein said light emissive means and said light responsive means are coupled together by light conducting fibers.
6. The device of claim 4 wherein said light emissive means comprises at least one light emitting diode.
7. The device of claim 4 wherein said light responsive means comprises at least one phototransistor.
8. The device of claim 1 wherein said optical coupling means comprises light emissive means in said first circuit means and light responsive means in said second circuit means.
9. The device of claim 1 wherein said optical coupling means comprises a first light responsive means and a first light emissive means in said first circuit means and a second light responsive means in an optically coupled relation with said first light emissive means and a second light emissive means in an optically coupled relation with said first light responsive means in said second circuit means.
10. A device for bidirectional communication between a pair of spaced circuits having a hybrid circuit means comprising in combination:
    a first pair of wires coupled to one of said pair of circuits and terminated by a first portion of said hybrid circuit means, said first pair of wires providing a first electrical communication line, said first portion of said hybrid circuit means having light emissive means in one of said first wires and light responsive means in the other of said first wires;
    a second pair of wires coupled to the other of said pair of circuits and terminated by a second portion of said hybrid circuit means, said second pair of wires providing a second electrical communication line, said second portion of said hybrid circuit means having light responsive means in said second line; and a third pair of wires coupled to said other of said pair of circuits and terminated by a third portion of said hybrid circuit means, said third pair of wires providing a third electrical communication line, said third portion of said hybrid circuit means having light emissive means in said third line said light emissive means in said first wires energizing said light responsive means in said second line, and said light emissive means in said third line energizing said light responsive means in said first wires, for providing said bidirectional communication and A.C. balance between the wires of said first pair, between the wires of said second pair and between the wires of said third pair.

11. The device of claim 10 including light emissive means coupled in series with the emitter-collector path of a first transistor in said one of said first wires and light emissive means coupled in series with the emitter-collector path of a second transistor in said other of said first wires, said light emissive means in said one of said first wires having opposite electrical polarity with respect to the polarity of said light emissive means in said other of said first wires for providing electrical balance between said first wires.

12. The device of claim 10 wherein:
said light emissive means in said third line comprises a pair of light emitting diodes;
said light responsive means in said second line comprise a pair of phototransistors; and
said second line and said third line are coupled together by resistance means for providing electrical balance between said second and third lines.

13. The device of claim 10 wherein said light emissive means in said one of said first wires is coupled to said light responsive means said second line by means of optical communication fibers, and wherein said light responsive means in said other of said first wires is coupled to said light emissive means in said third line by means of optical communication fibers.

14. The device of claim 13 wherein said optical communication fibers comprise light transparent material having a high index core and a cladding of lower index of refraction than said core.

15. A device for bidirectional communication between a first pair of electrical communication wires and a second and third pair of electrical communication wires, said first, second and third pair of wires being terminated in a hybrid circuit means to enable said bidirectional communication, said hybrid circuit means comprising in combination:

a first light emitting diode and a first phototransistor connected in series and a first transistsor having its base-collector path in parallel with said first phototransistor and its emitter coupled to said first diode in one of said first wires and a second light emitting diode and a second phototransistor connected in series and a second transistor having its base-collector path in parallel with said second phototransistor and in series with said second diode and its emitter coupled to the other of said first wires, said second light emitting diode and said second phototransistor having opposite polarity from said first light emitting diode and said first phototransistor for providing electrical balance between said first wires; and a pair of light emitting diodes serially connected in one of said third wires and a pair of phototransistors serially connected in one of said second wires, said one of said third wires and said one of said second wires being connected together by resistance means for providing electrical balance therebetween;

where light generated by said first and second light emitting diodes energizes said pair of phototransistors in said one of said second wires, and A.C. noise generated within said first wires is isolated from said second wires; and where light generated by said pair of light emitting diodes in said third wires energizes said first and second phototransistors, and A.C. noise generated within said third wires is isolated from said first wires.

16. The device of claim 15 wherein said light emitting diodes and said phototransistors are coupled together by means of light conducting fibers, said light conducting fibers comprising a high index of refraction core material and a low index of refraction cladding.

* * * * *